United States Patent [19]
Turner et al.

[11] Patent Number: 4,777,640
[45] Date of Patent: Oct. 11, 1988

[54] FREQUENCY ADAPTIVE PHASE JITTER CANCELER

[75] Inventors: Michael D. Turner, Madison; Jack L. Hayes, Huntsville, both of Ala.

[73] Assignee: Motorola, Inc., Schaumburg, Ill.

[21] Appl. No.: 872,076

[22] Filed: Jun. 9, 1986

[51] Int. Cl.$^4$ .................... H04L 25/40; H04L 27/06
[52] U.S. Cl. .................... 375/118; 328/155; 375/97
[58] Field of Search ........... 375/14, 118, 97; 364/160; 370/108; 328/155

[56] References Cited

U.S. PATENT DOCUMENTS

| | | | |
|---|---|---|---|
| 3,878,468 | 4/1975 | Falconer et al. | 375/96 X |
| 3,974,449 | 8/1976 | Falconer | 375/14 |
| 4,027,250 | 5/1977 | Lang | 375/118 X |
| 4,253,184 | 2/1981 | Gitlin et al. | 375/14 |
| 4,514,855 | 4/1985 | Lang et al. | 375/97 |
| 4,530,104 | 7/1985 | Kamerman | 375/14 |
| 4,646,325 | 2/1987 | Zuranski et al. | 375/14 X |

OTHER PUBLICATIONS

J. D. Harvey, "Carrier Phase Estimation and Phase Jitter Suppression for Data Modems," Conference: Colloquium on Phase-Locked Techniques, London, England, Mar. 26, 1980, pp. 4/1–4/7.

*Primary Examiner*—Stephen C. Buczinski
*Assistant Examiner*—Linda J. Wallace
*Attorney, Agent, or Firm*—Charles L. Warren

[57] ABSTRACT

A modem receiver circuit comprises one or more phase jitter canceling circuits for reducing sinusoidal components of phase jitter in a telecommunications channel. The receiver circuit automatically tracks multiple sinusoidal frequency components and jitter components varying slowly in amplitude and frequency. Each phase jitter canceling circuit is responsive to a phase angle error signal, which is scaled by an adaptive gain constant and appropriately signed. The corrected error signal is passed through a second order loop filter which contains an accumulator with a jitter frequency estimate. The output is integrated into an estimate of the phase of the sinusoidal jitter, which is converted into an estimate of the jitter angle by using a sine lookup table. The resulting estimated jitter component angle is added to the carrier loop phase angle estimate to derive a total receiver phase estimate. The circuit provides rapid acquisition of an accurate initial estimate for the jitter component. It also decouples the operation of the jitter canceling circuitry from the existing carrier phase loop circuitry to avoid harmful interactions.

10 Claims, 2 Drawing Sheets

FREQUENCY ADAPTIVE PHASE JITTER CANCELER

TECHNICAL FIELD

This invention relates generally to data communications, and, in particular, to a circuit for reducing the effects of phase jitter in a telephone communications channel.

BACKGROUND OF THE INVENTION

Sinusoidal phase jitter components commonly arise in communications channels between a data transmitter and a data receiver, especially in telephone lines. Such phase jitter components cause errors to occur when the data receiver attempts to recover the data signal from the carrier signal. The problem of phase jitter is compounded in present day, high speed synchronous modems, which often rely upon many closely packed points in a signaling "constellation" for the modulation and demodulation of the data carrier.

U.S. Pat. No. 4,514,855 describes a circuit for reducing the phase jitter attributable to a sinusoidal phase jitter component of known frequency. While the referenced invention significantly reduces phase jitter associated with an approximately known frequency component within a limited range, there is a significant need, regarding many types of communications channels, to cancel phase jitter associated with several frequency components over a wider frequency range and/or with components of slowly varying frequency. There is also a need to cancel phase jitter associated with low frequency components. Further, there is a need to very rapidly achieve such cancellation in the initial stages of communication.

By estimating the instantaneous phase angle induced by the jitter, it can be removed from the received signal before it reaches the decision algorithm of the receiver circuit.

The present invention minimizes the problem of phase jitter encountered by receivers connected to communications channels, such as modems utilizing telephone lines. In particular, the present invention describes a circuit that can rapidly acquire and refine an estimate of the phase jitter, and then track the phase jitter by updating the estimate in a closed loop fashion. Thus the undesirable effects of the phase jitter on the receiver operation are greatly reduced.

The present invention allows the receiver to operate on channels where jitter conditions would otherwise make any operation impossible. Further, the present invention allows operation on such channels that is only slightly degraded (approximately 0.5 dB) from that achieved on channels with no jitter whatsoever.

The present invention is capable of tracking any one sinusoidal jitter frequency or multiple sinusoidal jitter frequencies between approximately 0 and 300 Hz. The frequencies need not be harmonically related. The invention is also capable of tracking jitter components which are varying slowly in frequency as well as in amplitude.

The present invention also provides means for decoupling the phase jitter estimating process from the existing carrier phase loop circuit.

BRIEF SUMMARY OF INVENTION

Accordingly, it is an object of the present invention to provide an improved circuit for tracking and reducing the effects of phase jitter in a telecommunications channel.

It is also an object of the present invention to provide a phase jitter canceling circuit which automatically adapts to jitter components of different frequencies.

It is another object of the present invention to achieve cancellation in the initial stages of communication by rapidly acquiring an initial jitter estimate.

It is yet another object of the present invention to avoid harmful interaction with the existing carrier phase loop by the use of a decoupling circuit.

It is a further object of the present invention to provide a modem receiver circuit which utilizes a plurality of phase jitter canceling circuits, one for each jitter component.

These and other objects are achieved in accordance with a preferred embodiment of the invention by providing a modem receiver circuit including means for demodulating a received data signal, such signal including at least one sinusoidal phase jitter component of unknown frequency, such receiver circuit comprising at least one phase jitter canceling circuit for automatically suppressing the effect of the sinusoidal phase jitter component upon the received data signal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
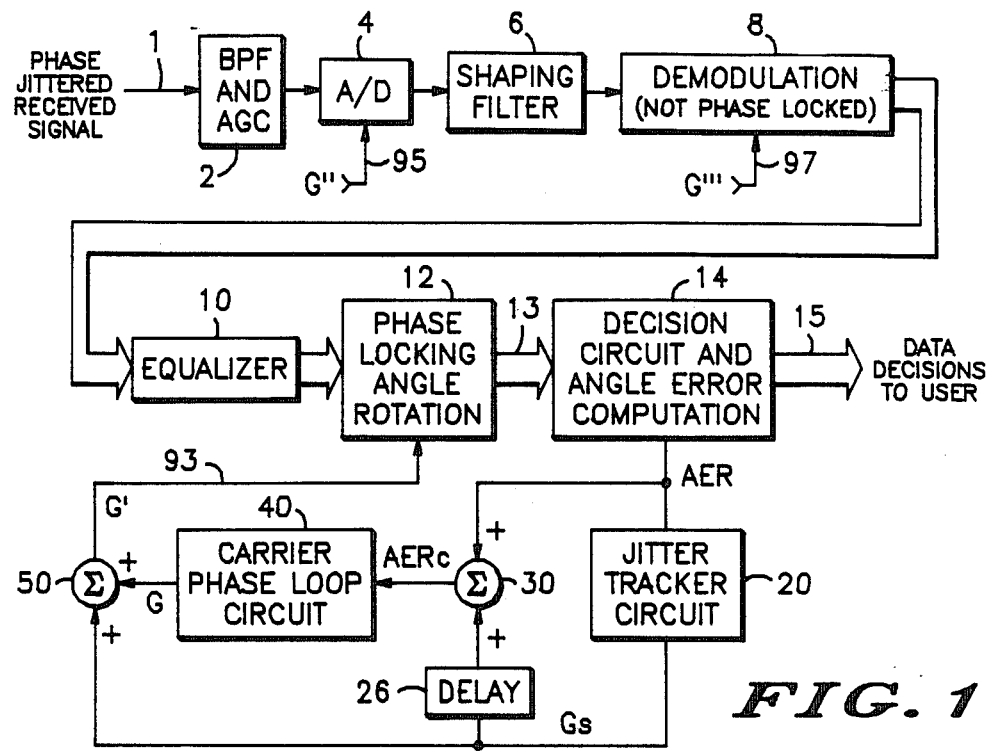
FIG. 1 shows a block diagram of a modem receiver incorporating the jitter canceling circuit of the present invention.

Referring now to FIG. 1, a block diagram of a typical modem receiver incorporating the jitter canceling circuit of the present invention is shown. The incoming phase-jittered signal present on the telephone line channel is first filtered and amplified by a band-pass filter and automatic gain control (AGC) circuit 2. Next the signal undergoes analog-to-digital (A/D) conversion by A/D converter 4.

The output of the A/D converter 4 undergoes spectral filtering by shaping filter 6. Next the signal is demodulated by demodulator 8, and the output is then equalized by equalizer 10. The phase of the equalizer output signal is then rotated by phase locking angle rotation circuit 12 in order to achieve phase coherence (i.e. phase lock) with the transmitter.

The rotated phase-locked signal is applied to a decision circuit 14 which generates a phase angle error signal AER upon comparison of the phase-locked signal input via conductor 13 with the data decision at the output of decision circuit 14.

The jitter tracker circuit 20 uses the AER signal to derive an estimate Gs of the phase jitter angle. In a receiver without a jitter canceling circuit, the AER signal would drive the carrier phase loop circuit. The estimate Gs of the phase jitter angle is summed by adder 50 with the usual carrier loop phase estimate G from carrier phase loop circuit 40, to derive a total receiver phase estimate G'.

The total receiver phase estimate G' is applied to the phase rotating circuit 12. In a receiver without a jitter canceling circuit, the phase rotating circuit 12 would normally be driven only by the carrier loop's phase estimate.

It should be noted that the effects of the previous jitter tracker phase estimation which are contained in the current AER signal are substantially cancelled at the input to the carrier phase loop filter 40. This cancellation prevents any undesired interactions between the jitter tracker circuit 20 and the carrier phase loop circuit 40, both of which respond in their own way to angle errors; such cancellation is referred to as "decoupling".

Decoupling is substantially accomplished by modifying the total angle error estimate AER by adding to it a delayed version of the phase jitter angle estimate GS to form a new error signal AERc to drive the carrier phase loop circuit 40. A summing circuit 30 generates the AERc signal by summing the AER signal and the Gs signal suitably delayed by delay circuit 26.

Figure 2:
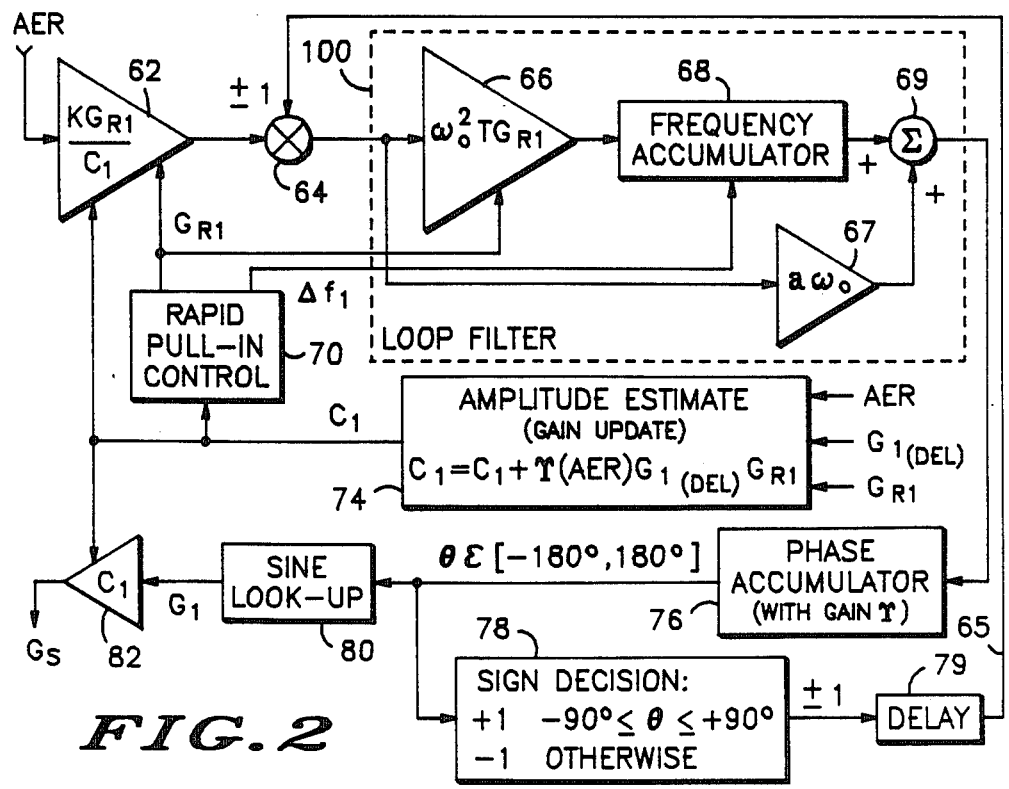
FIG. 2 shows a more detailed block diagram illustrating the jitter canceling circuit of the present invention.

The decoupling occurs because AER is approximately the carrier loop angle error plus the actual phase jitter minus the estimated phase jitter Gs that was used to perform the previous phase rotation that ultimately generated the AER value. Adding Gs to AER effectively cancels the negative Gs component of AER, eliminating the jitter tracker's effect from the carrier loop error signal. Referring now to FIG. 2, a more detailed block diagram illustrating the jitter canceling circuit 20 of the present invention is shown. The AER signal is first appropriately scaled by a variable gain amplifier 62, whose gain is responsive to both an amplitude estimate (gain update) signal C1 from circuit 74 and a gain signal GR1 from rapid pull-in control circuit 70. Variable gain amplifier 62 helps to control the loop bandwidth and accounts for the variable size of the input error signal amplitude.

The effect of C1 as applied to variable gain amplifier 62 will now be described. During the initial acquisition process before jitter frequency and phase have been accurately estimated, the value of C1 will remain very small. This is true because the amplitude estimate algorithm 74 (described below) will recognize that there is no sinusoidal component at the current (incorrect) frequency estimate. The fact that C1 is near zero results in a large gain in the variable gain amplifier 62, and the loop bandwidth of the jitter tracker phase estimate is correspondingly large, providing rapid response in acquiring frequency and phase estimates.

When the jitter frequency and phase approach the correct values, the estimated amplitude C1 grows toward the correct value. As C1 grows, the gain of amplifier 62 is reduced, and the jitter tracker bandwidth is likewise reduced to an appropriate value for accurate tracking. Thus, the loop bandwidth is self-adaptive during the acquisition process.

The output of variable gain amplifier 62 is applied to sign inversion circuit 64, where the sign of the error signal AER is corrected, depending upon the phase of the jitter estimate. The sign modification signal input to sign inversion circuit 64 is made via conductor 65 from sign decision circuit 78 and a delay circuit 79. The sign correction is needed to allow the existing error signal AER to be used to drive the jitter tracker. Sign decision circuit 78 generates a $+1$ output if the estimated phase angle $\theta$ is greater than or equal to $-90°$ or less than or equal to $+90$ degress, and it generates a $-1$ output if the estimated phase angle $\theta$ is less than $-90$ degrees or greater than 90 degrees.

The output of the sign inversion circuit 64 is input into a classical (except for an adaptation feature) second order loop filter circuit 100. Loop filter 100 comprises variable gain amplifier 66, the variable gain input of which is responsive to a gain signal GR1 from rapid pull-in control circuit 70. The output of variable gain amplifier 66 is passed into frequency accumulator 68, which provides an estimate of the jitter frequency. During initial acquisition the frequency accumulator 68 is responsive to an incremental frequency adjustment signal $\Delta f_1$ from rapid pull-in control circuit 70.

The output of the sign inversion circuit 64 is also input into a scaling circuit 67, whose gain is represented by the factor $a\omega_o$, where "a" controls the loop damping factor and "$\omega_o$" controls the loop bandwith (in conjunction with "a"), and whose output is summed with the output of frequency accumulator 68 by summing circuit 69. A typical value of "$\omega_o$" might be 5; a typical value of "a" is 1.4. The output of summing circuit 69 is applied to phase accumulator 76, which provides an estimate of the phase of the sinusoidal jitter.

The estimated phase signal provided by phase accumulator 76 is next converted by sine look-up table circuit 80 into an estimate of the sinusoidal jitter angle G1, to within an amplitude scale factor. The estimated sinusoidal jitter angle G1 is scaled by variable gain amplifier 82 by the estimate of jitter amplitude C1 provided by the amplitude estimate circuit 74, and the resulting output of scaling amplifier 82 is the estimate of phase jitter angle Gs for sinusoidal jitter component. The amplitude estimate provided by amplitude estimate circuit 74 is updated by using the phase angle error signal AER and a delayed version of the sinusoidal jitter component estimate G1(DEL) without amplitude scaling. The amplitude estimate is provided by the following least mean square update algorithm:

$$Cl(\text{new}) = Cl(\text{old}) + \gamma(AER) \cdot G(DEL) \cdot GR$$

wherein the symbols are defined as:
Cl = amplitude estimate
$\gamma$ = least means square update gain (typically 0.00025 to 0.001)
AER = phase angle error
Gl(DEL) = delayed jitter component estimate
GR1 = gain Regarding the value of $\gamma \cdot Gr1$, the initial value of 0.001 is ramped downward to a final value of 0.00025 through adjustment of GR1 according to the rapid pull-in control circuit 70.

As will be seen from FIG. 4 discussed below, the circuit may be modified appropriately to provide an estimate of the total estimated phase angle due to sinusoidal jitter from several sinusoidal jitter components. It is anticipated that when several sinusoidal jitter components are to be tracked, it will be necessary to decouple the tracking circuits from each other in much the same manner as a single jitter tracker has been decoupled from the carrier phase loop. This might be accomplished by summing G1 with AER before input to circuit 120 and by summing G2 with AER before input to circuit 20, for example.

Referring again to FIG. 1, the resulting estimate of the phase jitter angle Gs is added by adder 50 to the carrier loop phase angle estimate G to obtain the receiver estimate G' of the input signal phase at the point where rotation will be performed. This estimate G' is then passed to the phase locking angle rotation circuit 12.

The delays provided by delay circuit 26 (FIG. 1), by delay circuit 79 (FIG. 2), and by the delay within amplitude estimate circuit 74 are of known length (typically one or two sample times) and are substantially of equal duration. These delays compensate for the delay encountered between the time an angle estimate G' is produced and the time when a value of AER is received that was generated using that same G' value. This can be as small as one sample of the sampled data system.

Figure 3:
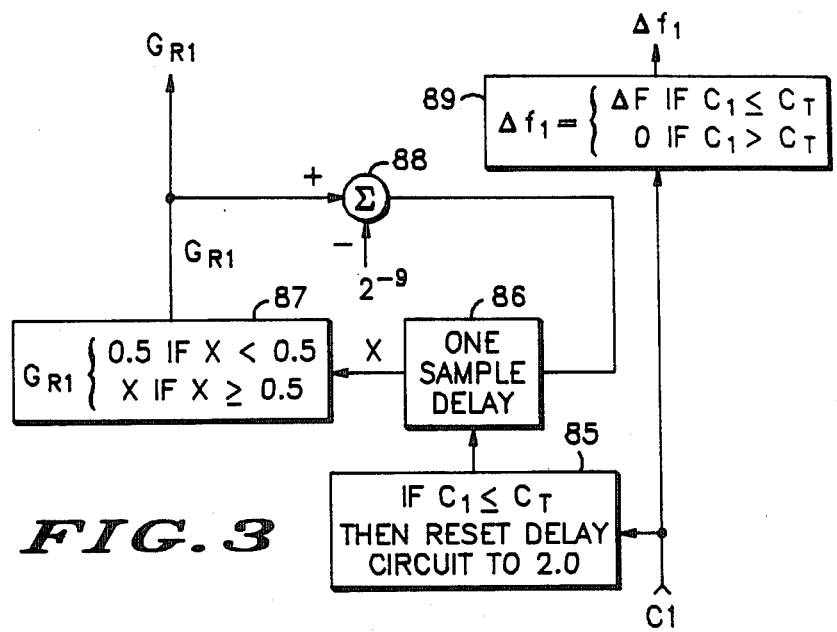
FIG. 3 shows a circuit diagram of the rapid pull-in circuit of the jitter canceling circuit shown in FIG. 2.

Referring now to FIG. 3, a circuit diagram of the rapid pull-in circuit 70 of the jitter canceling circuit 20 shown in FIG. 2 is shown. The rapid pull-in circuit 70 comprises decisional blocks 85, 87, and 89, as well as delay circuit 86 and summing circuit 88.

Decisional block 85 compares the value of C1 with the value of $C_T$, and if C1 is less than or equal to $C_T$, then delay circuit 86 is reset to 2.0. Delay circuit 86 accepts the output of summing circuit 88 and generates a signal X after a one-sample delay. Decisional block 87 compares signal X with the constant 0.5, and it outputs 0.5 if X is less than 0.5 and outputs X if X is greater than or equal to 0.5.

The GR1 output of decisional block 87 ranges from 2.0 to 0.5. The stepsize is $2^{-9}$.

Summing circuit 88 sums GR1 with $2^{-9}$ and outputs the result to delay circuit 86. Decisional block 89 compares the value of C1 with a threshold value $C_T$, and it outputs $\Delta F$ if C1 is less than or equal to $C_T$ and outputs 0 if C1 is greater than $C_T$. $\Delta F$ is approximately 13 Hz. $C_T$ is approximately 0.7 degrees.

The purpose of signal $\Delta f1$ generated by decisional block 89 is to adjust the frequency accumulator 68 every $N_f$ symbol times, where $N_f$ is approximately 128 symbol intervals (approximately 0.053 seconds).

The rapid pull-in circuit 70 provides two features to enhance rapid acquisition and pull-in. First, during initial acquisition the frequency estimate in the loop filter 100 is incremented periodically by a small frequency step $\Delta f$, unless the amplitude estimate C1 exceeds a certain threshold (indicating the frequency is already close).

Secondly, rapid pull-in circuit 70 provides a gain GR1 which is used to ramp the loop bandwidth and the effect of the amplitude estimate update factor $\gamma$ from values twice nominal during initial search to half nominal during tracking. The ramp is triggered to begin reducing the value of GR1 linearly with time when C1 exceeds the threshold as described above. An increase in C1 above the threshold can be shown to correspond to the state where estimates of jitter frequency and phase begin to approach the correct values.

Figure 4:
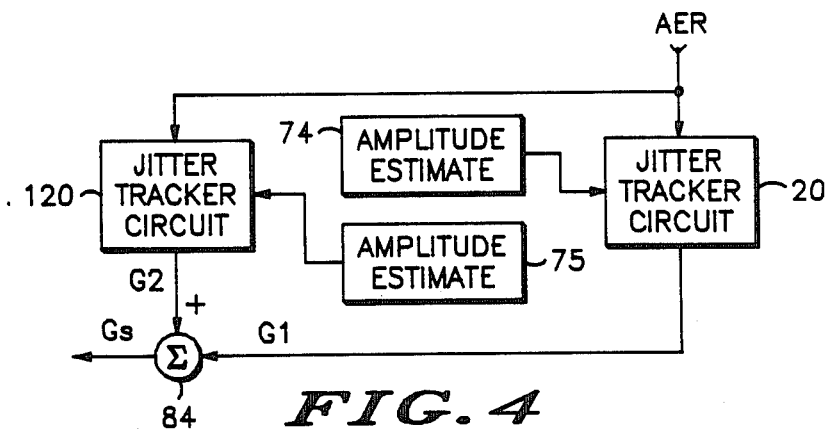
FIG. 4 shows another embodiment of the jitter canceling circuit of the present invention.

Referring now to FIG. 4, an alternative embodiment of the jitter canceling circuit of the present invention is shown in which the jitter tracking circuit is duplicated, as appropriate, to estimate an additional sinusoidal jitter component. An additional jitter tracker circuit 120, with its associated amplitude estimating circuit 75, is provided in parallel to jitter tracker circuit 20. Like jitter tracker circuit 20, jitter tracker circuit 120 is responsive to the AER signal. Jitter tracker circuit 120 provides an estimate of the phase jitter angle G2 for the sinusoidal jitter component which it is tracking. A summing circuit 84 sums the phase jitter angle estimates G1 and G2 to provide a resulting total estimated angle due to sinusoidal jitter Gs, which signal is thereafter processed as described above with reference to the circuit of FIG. 1. Additional phase jitter circuits may be employed as desired.

Some of the advantages of the present invention include (1) rapid acquisition of the initial estimate of the phase jitter component within 1.393 seconds (e.g., within V.33 specification requirements), (2) utilization of the already existing phase error signal, (3) utilization of just one second order loop circuit to estimate both frequency and phase, (4) cancellation of jitter over the frequency range 0 to 300 Hz, (5) frequency stepping, (6) gain ramping, (7) utilizing a variable adaptive loop bandwith by introduction of the factor 1/C1 into the loop based on the estimate of the jitter amplitude, and (8) decoupling of the carrier phase loop circuit from the jitter tracker circuit in order to estimate any undesirable interaction between the two circuits.

It will be apparent to those skilled in the art that the disclosed frequency adaptive phase jitter canceler may be modified in numerous ways and may assume many embodiments other than the preferred form specifically set out and described above.

For example, if it is found that a dynamic range problem is experienced in implementing the update equation (i.e., the value $\gamma$ to be used produces such a small number that no updates occur) then some accumulation of the update value may be done. The quantity (AER)·G1 could be accumulated for some time before multiplying by $\gamma$ and updating. This could be done for a fixed time period, or it could vary by waiting for $\gamma \cdot (AER) \cdot G1$ to reach some threshold each time, updating, and resetting the accumulation to zero. This approach (accumulation to reduce dynamic range) would require extra RAM components.

Also, different values could be selected for certain of the parameters such as $\gamma$, $a$, $\omega_o$, and GR1.

In addition, the phase rotation used to cancel jitter could be implemented at other suitable points in the receiver. For example, with reference to FIG. 1, instead of the total receiver phase estimate G' being applied to the phase locking angle rotation circuit 12, a corresponding total receiver phase estimate G'' could be applied via conductor 95 to A/D conversion circuit 4 or the total receiver phase estimate G''' could be applied via conductor 97 to demodulation circuit 8.

Accordingly, it is intended by the appended claims to cover all modifications of the invention which fall within the true spirit and scope of the invention.

What is claimed is:

1. A modem receiver circuit comprising means for demodulating a received data signal which includes at least one substantially sinusoidal phase jitter component of unknown frequency, said modem receiver circuit including:
   means for determining phase angle error between said received data signal and a reference signal;
   carrier loop means responsive to said phase angle error for changing the frequency of said reference signal to minimize the phase angle error;
   jitter tracking means responsive to said phase angle error for changing the phase of said reference signal to cancel said at least one sinusoidal phase jitter component; and decoupling means for substantially preventing said carrier loop means from being responsive to changes caused by said jitter tracking means resulting in enhanced stability of operation of said carrier loop means and jitter tracking means.

2. The modem receiver circuit according to claim 1 wherein said decoupling means comprises means for delaying the change provided by said jitter tracking means, and means for summing said phase angle error with said delayed change, said delay having a duration such that the result of said summing produces a modified phase angle error in which the change due to said jitter tracking means is cancelled, said carrier loop means receiving said modified phase angle error as its input to prevent said carrier loop means from responding to changes made by said jitter tracking means.

3. The modem receiver circuit according to claim 1 wherein said jitter tracking means comprises means for initially locking to said phase jitter component within 1.393 seconds.

4. The modem receiver circuit according to claim 1 wherein said jitter tracking tracks phase angle errors over a range of substantially 0–300 Hertz.

5. A modem receiver circuit comprising means for demodulating a received data signal which includes at least one substantially sinusoidal phase jitter component of unknown frequency, said modem receiver circuit including:

means for determining phase angle error between said received data signal and a reference signal;

jitter tracking means responsive to said phase angle error for changing the phase of said reference signal to cancel said at least one sinusoidal phase jitter component; and means for minimizing the time required for said jitter tracking means to initially lock to said phase angle error so that said initial lock is acquired within 1.393 seconds.

6. The modem receiver circuit according to claim 5 wherein said minimizing means comprises a closed loop filter and means for varying the bandwidth of said filter from a first bandwidth when said filter is not locked to a second bandwidth narrower than said first bandwidth when said filter is locked.

7. The modem receiver circuit according to claim 5 wherein said minimizing means comprises means for amplifying said phase angle error and means for varying the amplification provided by said amplifying means from a first gain when said filter is not locked to a second gain smaller than said first gain when said filter is locked.

8. The modem receiver circuit according to claim 6 wherein said minimizing means comprises means for amplifying said phase angle error and means for varying the amplification provided by said amplifying means from a first gain when said filter is not locked to a second gain smaller than said first gain when said filter is locked.

9. A method for substantially cancelling at least one sinusoidal phase jitter component of unknown frequency included in the demodulated received data signal to a modem receiver comprising the steps of:

determining the phase angle error between said received data signal and a reference signal;

changing the frequency of said reference signal to minimize the phase angle error;

changing the phase of said referene signal to cancel said at least once sinusoidal phase jitter component; and substantially preventing said change of phase of said reference signal from affecting the change of frequency of said reference signal to enhance the stability of operation of the jitter component cancelling means.

10. The method according to claim 9 further comprising the steps of delaying the change of phase of said reference signal, and summing said phase angle error with said delayed change of phase, said delay having a duration such that the result of said summing produces a modified phase angle error in which the change of phase of said reference signal is cancelled, said step of changing the frequency of said reference signal being responsive to said modified phase angle error thereby preventing said change of frequency from responding to changes in phase.

* * * * *

UNITED STATES PATENT AND TRADEMARK OFFICE
CERTIFICATE OF CORRECTION

PATENT NO. : 4,777,640

DATED : October 11, 1988

INVENTOR(S) : Turner et al.

It is certified that error appears in the above-identified patent and that said Letters Patent is hereby corrected as shown below:

On the Title Page, Item [73],
Assignee should be --UNIVERSAL DATA SYSTEMS, INC.-- and not "MOTOROLA, INC.".

Signed and Sealed this

Thirteenth Day of June, 1989

Attest:

DONALD J. QUIGG

*Attesting Officer*   *Commissioner of Patents and Trademarks*